United States Patent
Chatradhi et al.

(10) Patent No.: US 10,032,476 B2
(45) Date of Patent: Jul. 24, 2018

(54) MAGNETIC STORAGE SYSTEM MULTI-SENSOR SIGNAL PREDICTION HEALTH CONTROLLER

(71) Applicant: Western Digital Technologies, Inc., Irvine, CA (US)

(72) Inventors: Sridhar Chatradhi, San Jose, CA (US); Saurabh Deoras, Milpitas, CA (US); Martin Aureliano Hassner, Mountain View, CA (US); Natasa Letourneaut, Rochester, MN (US); Satoshi Yamamoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/346,818

(22) Filed: Nov. 9, 2016

(65) Prior Publication Data
US 2018/0130494 A1 May 10, 2018

(51) Int. Cl.
| | |
|---|---|
| G11B 5/455 | (2006.01) |
| G11B 20/18 | (2006.01) |
| G11B 20/10 | (2006.01) |
| G11B 5/012 | (2006.01) |

(52) U.S. Cl.
CPC .......... *G11B 20/1816* (2013.01); *G11B 5/455* (2013.01); *G11B 20/10305* (2013.01); *G11B 5/012* (2013.01); *G11B 2020/1869* (2013.01)

(58) Field of Classification Search
None
See application file for complete search history.

(56) References Cited

U.S. PATENT DOCUMENTS

| | | | |
|---|---|---|---|
| 7,304,816 B2 | 12/2007 | Johnson et al. | |
| 7,707,461 B2 | 4/2010 | Dougherty et al. | |
| 9,075,705 B2 | 7/2015 | Hikichi | |
| 2008/0010557 A1 | 1/2008 | Kume | |
| 2015/0074450 A1 | 3/2015 | Blount et al. | |
| 2015/0294689 A1 | 10/2015 | Leung et al. | |

FOREIGN PATENT DOCUMENTS

CN  104503874 A  4/2015

OTHER PUBLICATIONS

HDD Health failure prediction for hard drives and ssd drives, 1998, 2 pages, Panterasoft Available at: http://panterasoft.com/hdd-health/
(Continued)

*Primary Examiner* — Brian Butcher

(57) ABSTRACT

In general, techniques are described for monitoring health of a head in a magnetic data storage drive. A health controller may be configured to receive multi-variate sensor signals indicative of a respective reference value at least one head parameter, wherein the respective reference value is based in part on at least one initial measurement of parameters of the head obtained at a first time, determine a respective predicted current value based at least in part on a respective fixed-drift model and the multi-variate sensor signals, determine a respective actual current value that is based at least in part on at least one current measurement of the head obtained at a second time later than the first time, determine a health status for the head, and store the health status in memory.

20 Claims, 4 Drawing Sheets

(56) References Cited

OTHER PUBLICATIONS

Wang et al., A Two-Step Parametric Method for Failure Prediction in Hard Disk Drives, IEEE Transactions on Industrial Informatics, Feb. 2014, 12 pages, vol. 10, No. 1, IEEE Available at: http://www.ee.cityu.edu.hk/~twschow/pubs/papers/6.pdf.

Zhu et al., Proactive Drive Failure Prediction for Large Scale Storage Systems, 2013, 5 pages, IEEE Available at: https://www.computer.org/csdl/proceedings/msst/2013/0217/00/06558427.pdf.

MAGNETIC STORAGE SYSTEM MULTI-SENSOR SIGNAL PREDICTION HEALTH CONTROLLER

TECHNICAL FIELD

The disclosure relates to head degradation detection for magnetic data storage drives.

TECHNICAL BACKGROUND

Magnetic data storage drive read and write heads transform a magnetic field of a magnetic data storage medium into an electrical current that can be analyzed to determine the data content of the magnetic data storage medium and transform an electrical current into a magnetic field to store data at the magnetic data storage medium, respectively. The health of such heads is imperative to the consistent and reliable operation of a magnetic data storage drive, as damaged or out-of-specification heads can fail to read or write data or incorrectly read or write date to the magnetic data storage medium.

OVERVIEW

In one example, the disclosure is directed to a method comprising receiving, by a health controller for a magnetic data storage drive, multi-variate sensor signals indicative of respective reference values for each head parameter of at least one head parameter for a head of the magnetic data storage drive, wherein the respective reference values are based at least in part on at least one initial measurement of parameters of the head obtained at a first time; determining, by the health controller, a respective predicted current value for each head parameter based at least in part on a respective fixed-drift prediction model for each head parameter and the multi-variate sensor signals indicative of the respective reference values for each head parameter; determining, by the health controller, a respective actual current value, wherein the respective actual current value is based at least in part on at least one current measurement of the head obtained at a second time later than the first time; determining, by the health controller, a health status for the head based at least in part on a comparison between the respective predicted current value and the respective actual current value for each head parameter of the at least one head parameter; and storing the health status in memory.

In another example, the disclosure is directed to an apparatus comprising a health controller configured to receive multi-variate sensor signals indicative of respective reference values for each head parameter of at least one head parameter for a head of a magnetic data storage device, wherein the respective reference values are based at least in part on at least one initial measurement of parameters of the head obtained at a first time; determine a respective predicted current value for each head parameter based at least in part on a respective fixed-drift prediction model for each head parameter and the multi-variate sensor signals indicative of the respective reference values for each head parameter; determine a respective actual current value, wherein the respective actual current value is based at least in part on at least one current measurement of the head obtained at a second time later than the first time; determine a health status for the head based at least in part on a comparison between the respective predicted current value and the respective actual current value for each head parameter of the at least one head parameter; and store the health status in memory.

In another example, the disclosure is directed to a computer-readable storage medium containing instructions. The instructions cause a programmable processor to receive multi-variate sensor signals indicative of respective reference values for each head parameter of at least one head parameter for a head of a magnetic data storage drive, wherein the respective reference values are based at least in part on at least one initial measurement of parameters of the head obtained at a first time; determine a respective predicted current value for each head parameter based at least in part on a respective fixed-drift prediction model for each head parameter and the multi-variate sensor signals indicative of the respective reference values for each head parameter; determine a respective actual current value, wherein the respective actual current value is based at least in part on at least one current measurement of the head obtained at a second time later than the first time; determine a health status for the head based at least in part on a comparison between the respective predicted current value and the respective actual current value for each head parameter of the at least one head parameter; and store the health status in memory.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
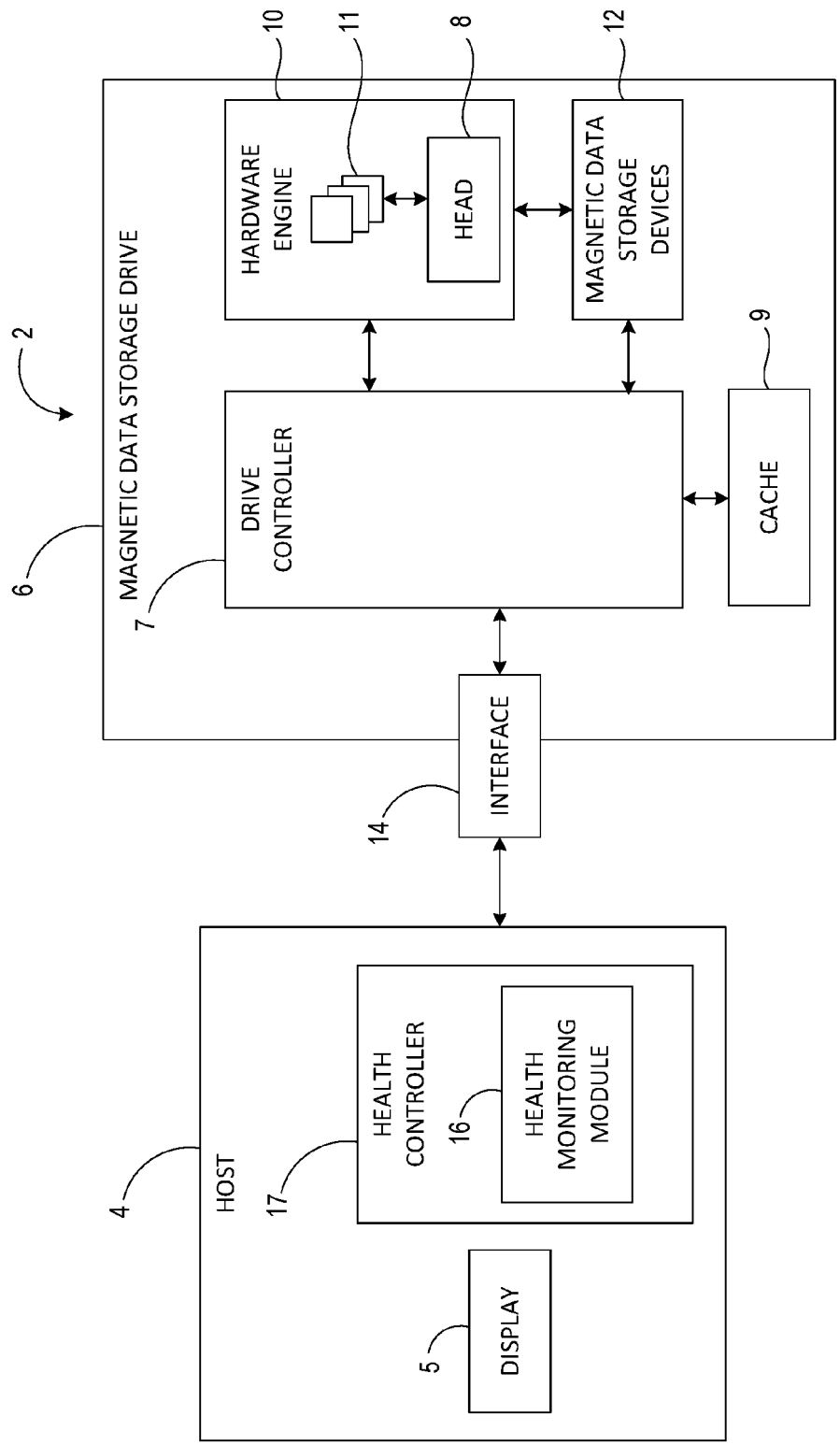
FIG. 1 is a conceptual and schematic block diagram illustrating an example storage environment in which a magnetic data storage drive may function as a storage device for a host device, in accordance with one or more techniques of this disclosure.

Techniques are described for monitoring health of a head in a magnetic data storage drive. Heads can be damaged in a multitude of ways, including trauma, contacting a platter of the magnetic data storage drive, significant acceleration or deceleration of the magnetic data storage drive, coming in contact with dirt or dust, or excessive shock, among other things. Currently, universal baseline reference values for particular head parameters are provided for a read head and/or a write head. In other words, for a particular set of read/write heads, the same reference values may be used, regardless of the respective head's initial capabilities, brand, size, or function. For example, head parameters for a read head that correlate to the health status of the read head include a magnetoresistive read head resistance (MRR), a difference between a sensor amplitude measurement for a low frequency sine pattern and a sensor amplitude measurement for a high frequency sine pattern in common mode (ETA), a soft error rate for read-only heads (SER_RDO), a delta flying height (dFH), and a servo variable gain amplifier (SVGA). As another example, head parameters for a write head that correlate to the health status of the write head include a delta flying height (dFH), a servo variable gain amplifier (SVGA), and a soft error rate for a read and a write (SER_RDW). However, such universal baseline reference values may have weak detection performance and high false-positive frequency rates for individual read heads and individual write heads. This is because each unique head, in its initial implementation, may begin with relatively low values for the head parameters compared to the universal baseline reference values or relatively high values for the head parameters compared to the universal baseline reference values, with each head still being considered a healthy head. By using a universal baseline across heads with varying initial reference values, slightly degraded heads may be falsely considered unhealthy or greatly degraded heads may be falsely considered healthy. Further, universal baseline reference values do not account for measurement noise levels. Not only may there be a head-to-head variation in mean distance from threshold, but there may be additional head-to-head variation in the repeatability of measurements. This variation in the repeatability of measurements can also lead to incorrect results. For example, smaller changes in more stable heads could be falsely taken as acceptable, while larger changes in less stable heads could be falsely labeled unacceptable.

Techniques described herein determine a health status for a head based on signal model predictions based on reference values for the respective head parameters taken from initial measurements at a first time for the particular head and comparing them to actual current signal values. The subsequent measurements of the head parameters taken for the particular head are compared against the predicted values to determine how much degradation has occurred in the particular head since the time of the initial measurement. This degradation ratio is a more accurate indicator of the health status of the particular head than a comparison to a universal baseline reference value. As such, determining the health status of a read/write head by comparing an actual value for a head parameter to a predicted value, determined by a signal model, for the head parameter may result in greater sensitivity to sick (or unacceptably degraded) heads with less susceptibility to false-positive detection.

FIG. 1 is a conceptual and schematic block diagram illustrating an example storage environment 2 in which magnetic data storage drive 6 may function as a storage device for host device 4, in accordance with one or more techniques of this disclosure. For instance, host device 4 may utilize non-volatile memory devices included in magnetic data storage drive 6 to store and retrieve data. In some examples, storage environment 2 may include a plurality of storage devices, such as magnetic data storage drive 6, that may operate as a storage array. For instance, storage environment 2 may include a plurality of magnetic data storage drives 6 configured as a redundant array of inexpensive/independent disks (RAID) that collectively function as a mass storage device for host device 4. While techniques of this disclosure generally refer to storage environment 2 and magnetic data storage drive 6, techniques described herein may be performed in any storage environment that utilizes magnetic recording. In some examples, magnetic data storage drive 6 may include a hard disk drive (HDD), a tape drive, or the like.

Storage environment 2 may include host device 4 which may store and/or retrieve data to and/or from one or more storage devices, such as magnetic data storage drive 6. As illustrated in FIG. 1, host device 4 may communicate with magnetic data storage drive 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like. Typically, host device 4 comprises any device having a processing unit, which may refer to any form of hardware capable of processing data and may include a general purpose processing unit (such as a central processing unit (CPU)), dedicated hardware (such as an application specific integrated circuit (ASIC)), configurable hardware (such as a field programmable gate array (FPGA)) or any other form of processing unit configured by way of software instructions, microcode, firmware or the like. Host device 4 further includes a display 5 that may be any type of display capable of presenting information to a user. Host device 4 also includes a health controller 17 that may be a hardware controller or may be implemented into host device 4 as a software controller. For the purpose of executing techniques of this disclosure, host device 4 may send tracks of data to drive controller 7 via interface 14 such that head 8 may write data to such tracks, or host device 4 may receive tracks of data from drive controller 7 that were read by head 8. Host device 4 further includes one or more features that may perform techniques of this disclosure, such as a health monitoring module 16. Health monitoring module 16 may be configured to perform various techniques of this disclosure, including the technique described below with respect to FIG. 1. Health monitoring module 16 may perform operations described herein using software, hardware, firmware, or a mixture of hardware, software, and/or firmware residing in and/or executing on host device 4.

As illustrated in FIG. 1, magnetic data storage drive 6 may include drive controller 7, head 8, cache 9, hardware engine 10, and interface 14. In some examples, magnetic data storage drive 6 may include additional components not shown in FIG. 1 for ease of illustration purposes. For example, magnetic data storage drive 6 may include power delivery components including, for example, a capacitor, super capacitor, or battery; a printed board (PB) to which components of magnetic data storage drive 6 are mechanically attached and which includes electrically conductive traces that electrically interconnect components of magnetic data storage drive 6; and the like. In some examples, the physical dimensions and connector configurations of magnetic data storage drive 6 may conform to one or more standard form factors. Some example standard form factors include, but are not limited to, 3.5" hard disk drive (HDD), 2.5" HDD, or 1.8" HDD.

Magnetic data storage drive 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), and PCI-express (PCIe). The electrical connection of interface 14 (e.g., the data bus, the control bus, or both) is electrically connected to drive controller 7, providing electrical connection between host device 4 and drive controller 7, allowing data to be exchanged between host device 4 and drive controller 7. In some examples, the electrical connection of interface 14 may also permit magnetic data storage drive 6 to receive power from host device 4.

In the example of FIG. 1, magnetic data storage drive 6 includes hardware engine 10, which may represent the hardware responsible for interfacing with the magnetic data storage devices 12. Hardware engine 10 may, in the context of a platter-based magnetic data storage drive, represent magnetic read/write head 8 and the accompanying hardware to configure, drive, and process the signals sensed by and outputted by magnetic read/write head 8. Although described in the following examples as being performed in the context of a magnetic data storage drive, the techniques described in this disclosure may be extended to any type of hardware engine as described in more detail below with respect to the example of FIG. 2.

Magnetic data storage drive 6 includes a drive controller 7, which may manage one or more operations of magnetic data storage drive 6. Drive controller 7 may interface with host device 4 via interface 14 and manage the storage of data to and the retrieval of data from magnetic data storage devices 12 accessible via hardware engine 10. In some examples, drive controller 7 may be a hardware controller. In other examples, drive controller 7 may be implemented into magnetic data storage drive 6 as a software controller.

Magnetic data storage drive 6 also includes magnetic read/write head 8. Magnetic read/write head 8 may be a device that transforms a physical magnetic flux into an electrical signal indicative of abstract bits, and vice versa. In other words, magnetic read/write head 8 may be operable by drive controller 7 to physically read the data in magnetic data storage devices 12 and convert the physical magnetic flux into an electrical signal indicative of abstract bits usable by host device 4.

Host 4 may, in this respect, interface with various hardware engines, such as hardware engine 10, to interact with various sensors 11. Host 4 may execute software, such as an operating system, to manage interactions between host 4 and hardware engine 10. The operating system may perform arbitration in the context of multi-core CPUs, where each core effectively represents a different CPU, to determine which of the CPUs may access hardware engine 10. The operating system may also perform queue management within the context of a single CPU to address how various events, such as read and write requests in the example of magnetic data storage drive 6, issued by host 4 should be processed by hardware engine 10 of magnetic data storage drive 6.

In the example of FIG. 1, one or more magnetic data storage devices 12 may be operable to store information for processing during operation of magnetic data storage drive 6 and host device 4. In some examples, magnetic data storage device 12 represents a magnetic data storage disk or a magnetic data storage tape configured for long-term storage of information. Techniques of this disclosure may enable health monitoring module 16 of host device 4 to perform health monitoring procedures on head 8. Drive controller 7 may receive a signal indicative of a respective reference value for each head parameter of at least one head parameter for magnetic read/write head 8 and communicate the signal to health controller 17 of host device 4. For example, the respective reference values may be stored in magnetic data storage devices 12, and drive controller 7 may receive a signal indicative of these respective reference values from hardware engine 10. In other examples, drive controller 7 may receive a signal indicative of the respective reference values from host 4 via interface 14. In still other examples, hardware engine 10 may convey a signal indicative of the respective reference values of head 8 during an initial measurement process. The respective reference value may be based at least in part on at least one initial measurement of magnetic read/write head 8 obtained at a first time, such as during the manufacturing process for magnetic read/write head 8 or during the initial installation of head 8 into magnetic data storage drive 6.

In some examples, the respective head parameter may be different for a read head than for a write head. For example, for a read head, the head parameter may include a magnetoresistive read head resistance (MRR), a difference between a sensor amplitude measurement for a low frequency sine pattern and a sensor amplitude measurement for a high frequency sine pattern in common mode (ETA), a soft error rate for read-only heads (SER_RDO), a delta flying height (dFH), and a servo variable gain amplifier (SVGA). As another example, for a write head, the head parameter may include a delta flying height (dFH), a servo variable gain amplifier (SVGA), and a soft error rate for read-and-write heads (SER_RDW). For purposes of illustration of the technique of FIG. 1, a head health determination for a read head based on ETA will be described, although it will be appreciated that another parameter or more than one parameter may be used as an indication of read head health, and similar techniques may be used to determine write head health based on at least one parameter, such as dFH, SVGA, or SER_RDW. In such an example, drive controller 7 may receive a signal from hardware engine 10 that indicates the ETA for head 8 during an initial measurement taken during manufacturing of magnetic read/write head 8 or when magnetic read/write head 8 was installed in magnetic data storage drive 6. Alternatively, the signal may represent the ETA of a typical magnetic read/write head 8 for any manufactured head by the manufacturer.

From this received signal communicated to health controller 17 from drive controller 7, health monitoring module 16 of health controller 17 may determine the respective reference value for each of the at least one head parameters. For instance, health controller 17 may analyze the signal received from hardware engine 10, magnetic data storage devices 12, or any other component that may send the signal to health controller 17, in order to determine what the respective reference value is for each of the at least one head parameters. In the example described above, health controller 17 may determine the ETA from the signal received from hardware engine 10. It should be noted that this is merely an example ETA, and example initial ETAs may vary based on manufacturer, purpose, preamp/channel gain settings, and other design elements. As noted, the magnetic data storage drives that may implement the techniques of this disclosure do not have uniform characteristics, and it is the change in the values of the head parameters that is useful in determining the health status of the head rather than the initial value itself.

Health monitoring module 16 of health controller 17 may further utilize hardware engine 10 to determine a respective actual current value for each head parameter. The respective actual current value may be based at least in part on at least one current measurement of the respective parameter obtained at a second time later than the first time, e.g., sometime after magnetic read/write head 8 has been installed in hardware engine 10. In some examples, the actual current value for the head parameters may be determined after a predetermined period of time has passed. In other examples, the actual current value for the head parameters may be determined after an unusual, traumatic event has occurred, such as after a strong force strikes magnetic data storage drive 6, after a strong shock or vibration occurs, or after any other event that presents a significant chance that magnetic read/write head 8 may have been damaged. Checking the actual current value of each head parameter after such an event allows health controller 17 to determine a health status for magnetic read/write head 8 after likely times that magnetic read/write head 8 may be damaged without constantly monitoring the health of magnetic read/write head 8, which may reduce power usage and processing time.

Health monitoring module 16 of health controller 17 may determine a health status for magnetic read/write head 8 based at least in part on a comparison between the respective predicted value, based on past measurements, and the respective actual current value for each of the at least one head parameter. In this comparison, the respective mean square prediction error may be compared to a threshold value determined by a log-likelihood confidence level. Health monitoring module 16 of health controller 17 may determine that the health status of magnetic read/write head 8 is healthy when the respective mean square prediction error value is less than the threshold value. Conversely, health monitoring module 16 of health controller 17 may determine that the health status of magnetic read/write head 8 is not healthy when the respective mean square prediction error value is greater than the threshold value.

Continuing the example above, health monitoring module 16 of health controller 17 may make a comparison based on the predicted ETA value (based on past measured values) for magnetic read/write head 8 and the actual current ETA for magnetic read/write head 8. Based on this comparison, health monitoring module 16 of health controller 17 determines the health status for magnetic read/write head 8. Regardless of the initial value of the ETA, small variances in the ETA may be benign and not indicate a degraded read/write head 8. However, large changes in ETA may indicate a blown head hard bias, which may cause signal asymmetry to jump beyond the read channel's ability to compensate. Thus, large changes in ETA may indicate that head 8 is not healthy.

By using the prediction (based on previous measurement values) of the current disclosure, controllers (such as health controller 17) that monitor the health of a magnetic read/write head 8 in a magnetic data storage drive 6 may realize a higher detection performance while reducing false-positive frequency rates. Health controller 17 may receive subsequent measurements of the head parameters for the particular magnetic read/write head 8 and compare the actual current values of the head parameters against the predicted values to determine how much degradation has occurred in the particular magnetic read/write head 8 since the time of the initial measurement. This degradation ratio may be a better indicator of the health status of the particular head than a mere comparison to a universal value. By exchanging predicted values for the self-referential (relative) values described herein, the natural variance present in the manufacturing and implementation processes can be suppressed such that the health status of various read/write heads in a magnetic data storage drive may be more reliably assessed.

In the example of FIG. 1, health controller 17 is shown to be part of host 4. It should be noted, however, that some or all of the functionality of controller 17 with regards to the techniques described in the current disclosure may be implemented in another processor, such as a processor of magnetic data storage drive 6, or a processor of a remote server. For instance, a remote server may store the respective reference values for magnetic read/write head 8 based on a signal received from magnetic data storage drive 6 indicating the initially-measured respective reference values. Magnetic data storage drive 6 may send values indicative of the actual current values for each of the at least one head parameters to the remote server. The remote server may determine the actual current values for each of the at least one head parameters based on the received signal and determine the health status for head 8 based at least in part on a comparison between the stored respective reference value and the received respective actual current value for each of the at least one head parameters.

Figure 2:
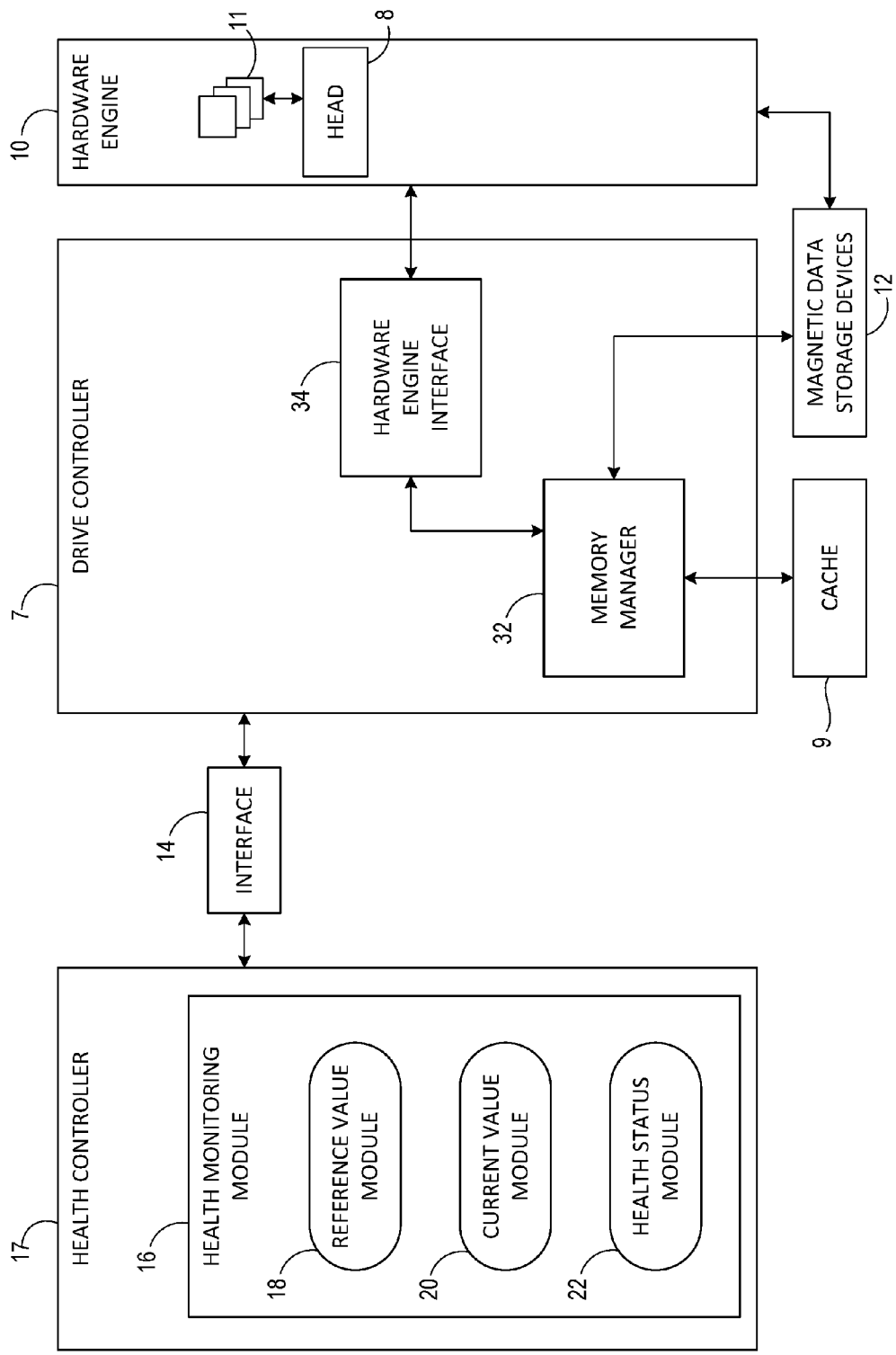
FIG. 2 is a block diagram illustrating the drive controller and health controller and other components of the host device and magnetic data storage drive of FIG. 1 in more detail.

FIG. 2 is a block diagram illustrating drive controller 7 and health controller 17 and other components of host device 4 and magnetic data storage drive 6 of FIG. 1 in more detail. In the example of FIG. 2, drive controller 7 of magnetic data storage drive 6 includes a memory manager unit 32 and a hardware engine interface unit 34. Controller 17 includes health monitoring module 16. Drive controller 7 and health controller 17 are in communication with interface 14.

Hardware engine interface unit 34 may perform various functions of a controller of a magnetic data storage drive. For instance, hardware engine interface unit 34 may be configured to facilitate communications between drive controller 7 and hardware engine 10. Hardware engine interface unit 34 may present a standardized or uniform way by which drive controller 7 may interface with hardware engine 10. Hardware engine interface unit 34 may provide various configuration data and events to hardware engine 10, which may then process the event in accordance with the configuration data, returning various different types of information depending on the event. In the context of an event requesting that data be read (e.g., a read request), hardware engine 10 may return the data to hardware engine interface unit 34, which may pass the data to memory manager unit 32 of drive controller 7. Memory manager unit 32 of drive controller 7 may store the read data to cache 9 and return a pointer or other indication of where this read data is stored to hardware engine interface unit 34 of drive controller 7. In the context of an event involving a request to write data (e.g. a write request), hardware engine 10 may return an indication that the write has completed to hardware engine interface unit 34. In this respect, hardware engine interface unit 34 may provide a protocol and handshake mechanism with which drive controller 7 may interface with hardware engine 10.

Health monitoring module 16 of controller 17 includes various modules, including reference value module 18, current value module 20, and health status module 22. The various modules of health monitoring module 16 may be configured to perform various techniques of this disclosure, including the technique described above with respect to FIG. 1. Reference value module 18, current value module 20, and health status module 22 may perform operations described herein using software, hardware, firmware, or a mixture of two or more of hardware, software, and firmware residing in and/or executing on magnetic data storage drive 6.

Using reference value module 18, current value module 20, and health status module 22, controller 17 may perform techniques of this disclosure to determine a health status for a head of a magnetic data storage drive, such as head 8 of magnetic data storage drive 6. For example, reference value module 18 of controller 17 may receive a signal from a respective sensor 11 indicative of a respective reference value for each head parameter of at least one head parameter for head 8 of magnetic data storage device 6. The respective reference value may be based at least in part on at least one initial measurement of parameters of head 8 obtained at a first time. In some examples, the at least one initial measurement may include at least one measurement taken during manufacture of head 8. In other examples, the at least one initial measurement may include at least one measurement taken during installation of head 8 into magnetic data storage drive 6. In some examples, the respective reference value includes a respective reference distribution of a plurality of data points for each respective head parameter. Reference value module 18 of controller 17 may receive or determine the respective reference value.

In some examples, the respective head parameters may be different for a read head than for a write head. For example, for a read head, the head parameter may include at least one of a magnetoresistive read head resistance (MRR), a difference between a sensor amplitude measurement for a low frequency sine pattern and a sensor amplitude measurement for a high frequency sine pattern in common mode (ETA), a soft error rate for read-only heads (SER_RDO), a delta flying height (dFH), and a servo variable gain amplifier (SVGA). As another example, for a write head, the head parameter may include at least one of a delta flying height (dFH), a servo variable gain amplifier (SVGA), and a soft error rate for read-and-write heads (SER_RDW). For instance, head 8 may be a write head, and the head parameter may be the dFH. In such an example, a reference value (or an average of a reference distribution) may be initially measured at 0. It should be noted that this is merely an example value for an in initial dFH, and initial dFHs may vary based on manufacturer, purpose, preamp/channel gain settings, and other design elements. As noted, the magnetic data storage drives that may implement the techniques of this disclosure do not have uniform characteristics, and it is the change in the values of the head parameters that is useful in determining the health status of the head rather than the initial value itself.

Current value module 20 of controller 17 may determine a respective actual current value for each head parameter. The respective actual current value may be based at least in part on at least one current measurement of head 8 obtained at a second time later than the first time. In some examples, the respective actual current values for the head parameters may be determined after a predetermined period of time has passed from the time at which the respective reference values for the parameters were obtained. The predetermined period of time may be the same or different for each of the head parameters. In other examples, the actual current value for the at least some of head parameters may be determined after an unusual, traumatic event has occurred, such as after a strong force strikes magnetic data storage drive 6, after a strong shock or vibration occurs, or after any other event that presents a significant chance that magnetic read/write head 8 may have been damaged or its operation changed. Checking the actual current value of each head parameter after an unusual, traumatic event may allow controller 17 to determine a health status for magnetic read/write head 8 after likely times that magnetic read/write head 8 may be damaged without constantly monitoring the health of magnetic read/write head 8, which may reduce power usage and processing time for reads and writes.

Figure 3:
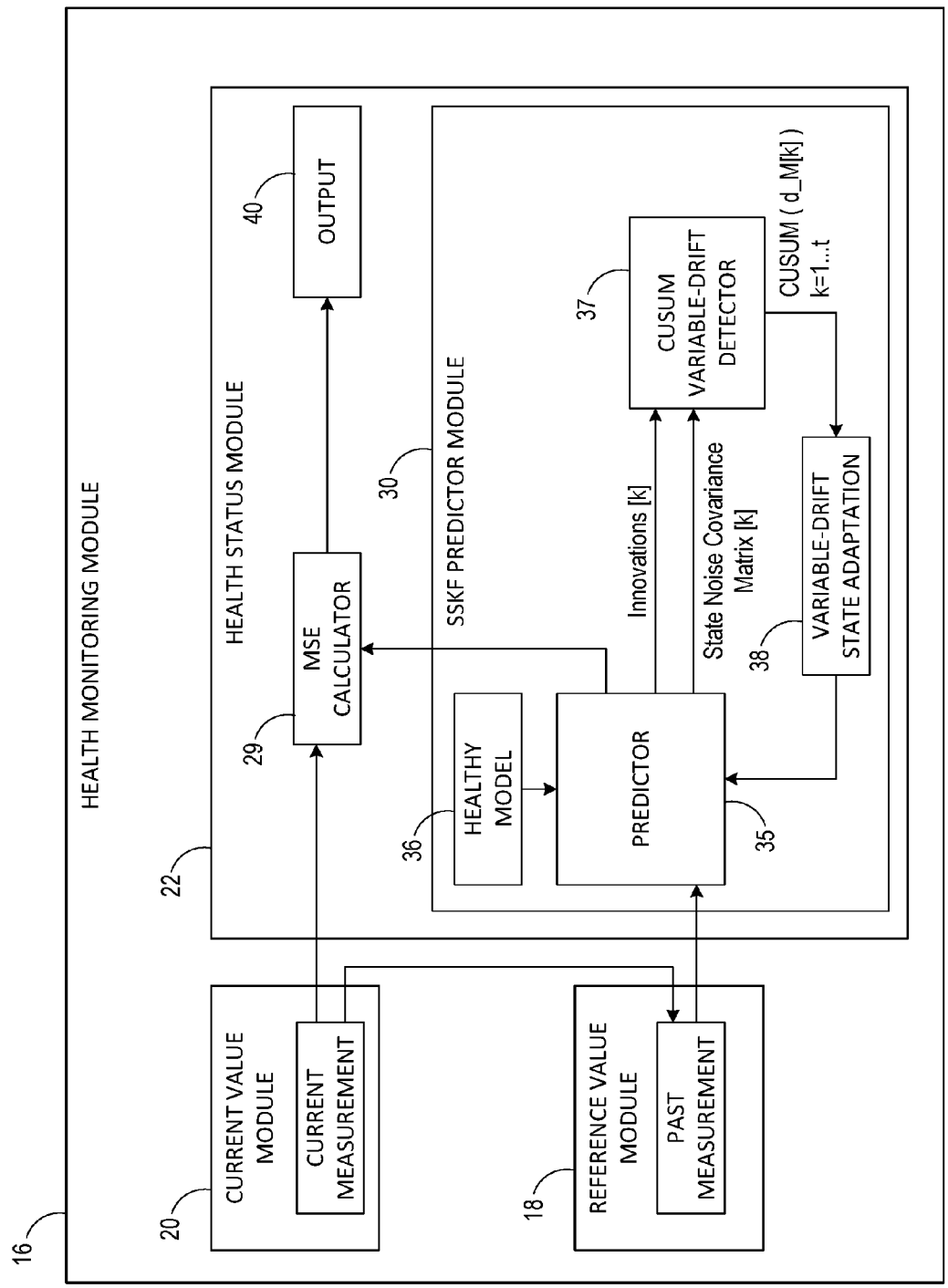
FIG. 3 is a block diagram illustrating the health monitoring module of FIGS. 1 and 2 in more detail.

FIG. 3 is a block diagram illustrating health monitoring module 16 of FIGS. 1 and 2 in more detail. In another example of determining the health status, health status module 22 may calculate a multivariate log-likelihood value indicating a joint statistical deviation for each head parameter based at least in part on the past values and the respective actual current value for each head parameter. In some such examples, to calculate the multivariate log-likelihood value, reference value module 18 may calculate a reference distribution of the at least one head parameter from log data during a first time window.

Current value module 20 may further calculate an actual current distribution for the at least one head parameter from log data during a second time window for the head of the magnetic data storage drive. The second time window may be later than the first time window.

Using the calculated information, health status module 22 may calculate a current mean square error (MSE) distance using an MSE calculator 29. In this example, the current mean square error is determined by first finding a difference between the actual current distribution and the predicted reference distribution. To determine the health status, health status module 22 may compare the current mean square error to a threshold value. For example, when the current mean square error distance (calculated by MSE calculator 29) exceeds a threshold value, health status module 22 may determine that the head is likely to be unhealthy. Conversely, when the current mean square distance (calculated by MSE calculator 29) does not exceed the threshold value, health status module 22 may determine that the head is likely to be healthy and may gather actual current values for each of the head parameters at a third, later time period. Health status module 22 then may recalculate the predicted value, based on past measurements and based on the current mean square distance from log data during the third time window for head 8.

Steady state Kalman filter (SSKF) predictor module 30 is a variable-drift adaptive SSKF predictor with Mahalanobis-distance change detector feedback. A predictor 35 of SSKF predictor module 30 calculates predicted values based on a healthy model 36 and the past measurements from reference value module 18. The healthy model 36 is a model that has a variable linear-trend and fixed drift, which allows signal values to vary randomly based on a fixed slope. A cumulated sum (cusum) of the Mahalanobis distances accumulated by a cumulated sum detector 37 shows how the instantaneous Mahalanobis-distances between observed data and the signals from the constant drift healthy model 36 (d_M[k]) change over time. A variable-drift state adaptation module 38 changes the healthy model 36 based on the cumulated sums, and the predictor 35 bases the next predictions based on the changed healthy model. In this way, the normally fixed-drift prediction healthy model 36 is treated as a variable-drift model. To modify the fixed-drift prediction healthy model 36, a cumulated sum of respective predicted log-likelihood values is calculated. A drift in the calculated sum of respective predicted log-likelihood values is calculated, and a variable-drift state adaptation of the respective fixed-drift prediction model is calculated based on the calculated drift. The respective fixed-drift prediction model is modified based on the variable-drift state adaptation.

In this example, the MSE calculator 29 can verify if the anomalies detected in the cumulated sums match the current/observed measurements. If there is agreement between the prediction output by predictor 35 and the current/observed measurements that the current mean distance exceeds the threshold value, then the health status module 22 may determine that the head is likely to be unhealthy. If there is no agreement between the prediction output by predictor 35 and the current/observed measurements, then the health status module 22 may determine that the head is only temporarily unhealthy and will wait for an agreement before determining that the head is likely to be unhealthy. A temporarily unhealthy head may not need immediate service or replacement and may return to full working functionality.

Predictor 35 may be programmed based on the following equations. A first set of equations correspond to linear trend, fixed-drift model equations (Eqns. 1-4 below).

Equation 1 is a regressive level equation and is given as:

$$l_{t+1}=T_t l_t+s_t+R_t w_t \quad \text{(Eqn. 1)}$$

where $l_{t+1}$ is the signal level state-vector, $l_t$ is the signal level-state, $T_t$ is the state transition matrix, $s_t$ is the signal drift-state, $R_t$ is the state-noise transition matrix, and $w_t$ is the state noise vector.

Equation 2 is a non-regressive drift equation and is given as:

$$s_{t+1}=s_t \quad \text{(Eqn. 2)}$$

where $s_{t+1}$ is kept constant equal to its value at time t.

Equation 3 is a multi-variate (MV) sensor model state and is given as:

$$x_t = \begin{bmatrix} l_t \\ s_t \end{bmatrix} \quad \text{(Eqn. 3)}$$

where $x_t$ is the state vector composed of level and drift components, $l_t$ and $s_t$.

Equation 4 corresponds to an observed MV-sensor series and is given as:

$$y_t=Z_t x_t+v_t \quad \text{(Eqn. 4)}$$

where $y_t$ is the observation vector, $Z_t$ is a time-variable transition matrix, and $v_t$ is the observation noise vector.

A second set of equations correspond to linear trend, variable-drift model equations (Eqns. 5-8 below).

Equation 5 is a regressive level equation and is given as:

$$l_{t+1}=T_t l_t+s_t+R_t w_t \quad \text{(Eqn. 5)}$$

where $l_{t+1}$ is the signal level state-vector, $l_t$ is the signal level-state, $T_t$ is the state transition matrix, $s_t$ is the signal drift-state, $R_t$ is the state-noise transition matrix, and $w_t$ is the state noise vector.

Equation 6 is a regressive drift equation and is given as:

$$s_{t+1}=B_t s_t+n_t \quad \text{(Eqn. 6)}$$

where $B_t$ is the drift-state transition matrix, $s_t$ is the drift-state vector, and $n_t$ is the drift-noise vector.

Equation 7 is a model state equation and is given as:

$$x_t = \begin{bmatrix} l_t \\ s_t \end{bmatrix} \quad \text{(Eqn. 7)}$$

where $x_t$ is the state vector composed of level and drift components, $l_t$ and $s_t$.

Equation 8 is an observed MV-data series and is given as:

$$y_t=Z_t x_t+v_t \quad \text{(Eqn. 8)}$$

where $y_t$ is the observation vector, $Z_t$ is a time-variable transition matrix, and $v_t$ is the observation noise vector.

A third set of equations correspond to equations of an Expectation Maximization (EM) algorithm/Kalman filter (Eqns. 9-17 below).

Recursive MV-linear filter matrix equations (Eqns. 9-15 below) of the third set of equations with init:=$\mu_0, \Sigma_0$ (where $\mu_0$ is the initial "mean-vector" and $\Sigma_0$ is the initial "covariance matrix" chosen to start the Kalman-Filter iterative calculation) are as follows:

$$x_t^s = E(x_t|Y_s), \quad \text{(Eqn. 9)}$$

which is a state-predictor at time t, given up to time s past-observations, $Y_s=y_k$, k=1, ..., s, where E is the expectation operator, and where $x_t$ is is the state vector at time t.

$$Q_{t_1,t_2}^s = E[(x_{t_1}-x_{t_1}^s)(x_{t_2}-x_{t_2}^s)], \quad \text{(Eqn. 10)}$$

which is a state covariance matrix, where E is the expectation operator, where $x_{t_1}$ is the state-vector at time $t_1$, where $x_{t_1}^s$ is the state predictor at time $t_1$, given up to time s past observations $Y_s$, where $x_{t_2}$ is the state vector at time $t_2$, where $x_{t_2}^s$ is the state predictor at time $t_2$.

$$x_t^{t-1} \Phi x_{t-1}^{t-1} \quad \text{(Eqn. 11)}$$

where $x_t^{t-1}$ is the state predictor at time t given up to time t−1 past observations, $\Phi$ is a state transition matrix, and $x_{t-1}^{t-1}$ is the state predictor at time t−1 given up to t−2 past observations.

$$x_t^t = x_t^{t-1} + K_t(y_t - A x_t^{t-1}) \quad \text{(Eqn. 12)}$$

where $x_t^t$ is is the predicted state vector at time t given past observations up to time t, $x_t^{t-1}$ is the predicted state vector at time t given past observations up to t−1, $K_t$ is the Kalman Filter Gain, $y_t$ is the time t observed data vector, A is a weight matrix that maps the state estimate into observed data, and $x_t^{t-1}$ is the state predictor at time t given up to t−1 observations.

$$Q_{t-1}^t = \Phi Q_{t-1}^{t-1} \Phi^T \quad \text{(Eqn. 13)}$$

where $Q_{t-1}^t$ is the predicted state covariance matrix at time t given observations up to time t−1, $\Phi$ is the state transition matrix, $Q_{t-1}^{t-1}$ is the predicted state noise covariance matrix at time t−1 given observations up to time t−1, and $\Phi_T$ is the transpose of the state transition matrix.

$$Q_t^t = [I-K_t A]Q_t^{t-1} \quad \text{(Eqn. 14)}$$

where $Q_t^t$ is the predicted state noise covariance matrix at time t given past observations up to time t, I is the unit matrix, $K_t$ is the Kalman Filter Gain at time t, A is a weight matrix that maps the state estimate into observed data, and $Q_t^{t-1}$ is the predicted state noise covariance matrix at time t given observations up to time t−1.

$$K_t = Q_t^{t-1} A^T [A Q_t^{t-1} A^T]^{-1} \quad \text{(Eqn. 15)}$$

which is a filter gain, where $K_t$ is the Kalman Filter Gain at time t, A is a weight matrix that maps the state estimate into observed data, $Q_t^{t-1}$ is the predicted state noise covariance matrix at time t given observations up to time t−1, and $A^T$ is the transpose of the weight matrix A.

Standardized Innovations Series Output (Eqns. 16-17 below) of the third set of equations are as follows:

$$innov_t = y_t - E(x_t | Y_{t-1}) = y_t - A^T x_t^{t-1} \quad \text{(Eqn. 16)}$$

-continued $$stInnov_t = \frac{innov_t}{\sqrt{P_t^{t-1}}}$$ (Eqn. 17)

where $stInnov_t$ is the standardized innovation, and $P_t^{t-1}$ is the predicted innovation covariance at time t given up to t−1 observations.

The determination of the head being healthy or unhealthy by the MSE calculator 29 can be sent to an output 40 for reporting the finding to a user. In one example, output 40 shows the determination result on display 5 of host 4 so that a user can take the appropriate action.

While a single SSKF predictor module 30 is shown in FIG. 3, a plurality of SSKF predictor modules may be implemented to measure multiple health indexes. For example, health monitoring module 16 may include a head health index SSKF predictor, a media health index SSKF predictor, a servo health index SSKF predictor, and a usage health index SSKF predictor as examples. The combination of comparisons of the predicted data from the multiple SSKF predictors with respective measured values can provide a larger picture of the health of the magnetic data storage drive 6 (FIG. 1).

In some examples, a magnetic data storage drive 6 (FIG. 1) may include multiple heads (e.g., one or two per magnetic data storage device 12), and the techniques described herein may be implemented on a per head basis. In some examples, once health status module 22 determines that a head is unhealthy (or failed), the entire drive may be considered unhealthy. In other examples, once health status module 22 determines that a head is unhealthy, steps may be taken to attempt to fix the unhealthy head. For instance, in an environment that implements an error recovery procedure (ERP), if health status module 22 determines that an actual current value for a given head parameter exceeds the defined threshold change from the prediction output by predictor 35, different portions of magnetic data storage drive 6 may take measures to attempt to fix the unhealthy head. As such, the threshold change may be less in an environment that implements ERP, thereby allowing the magnetic data storage drive 6 to detect the unhealthy activity and attempt recovery before magnetic data storage drive 6 is beyond repair. Conversely, in the above example where the failed head 8 deems the entire drive 6 to be unhealthy, the threshold change may be larger such that the drive 6 may used for a longer period of time. In other words, based on the various needs and capabilities of the environment, as well as the manufacturing characteristics of the drive itself, the various thresholds and initial values for the head parameters may vary to fit the needs of the particular environment.

Figure 4:
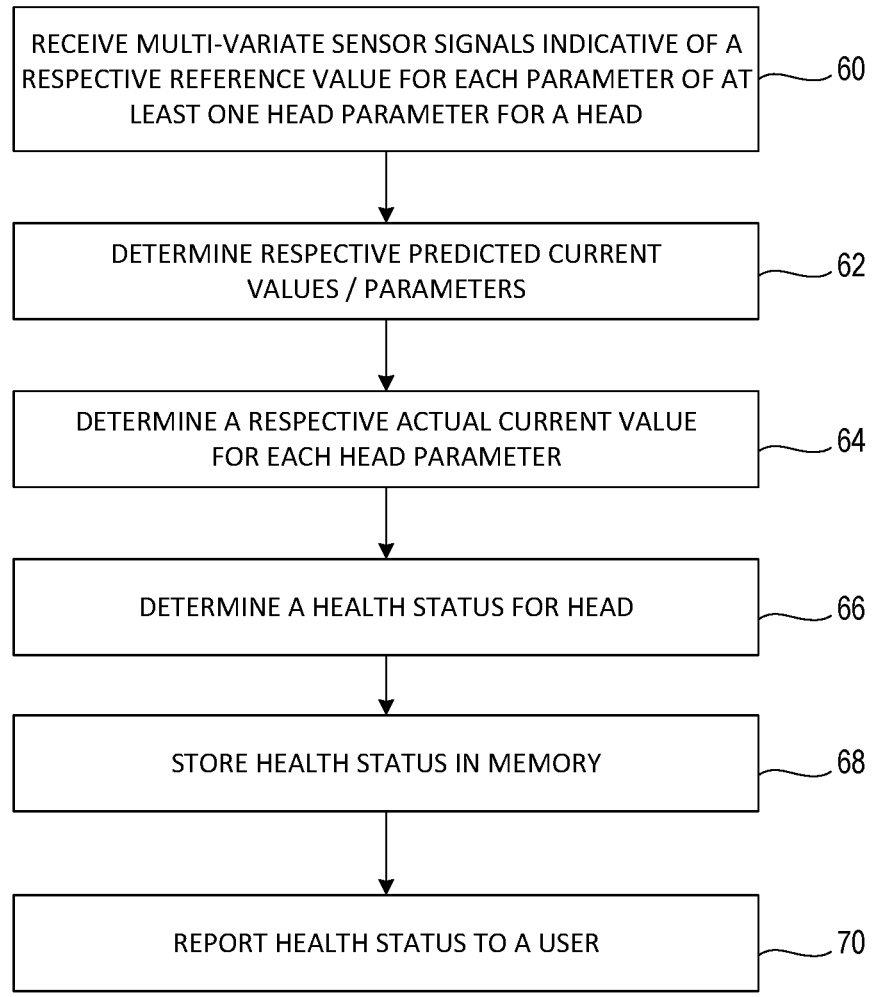
FIG. 4 is a flow diagram illustrating exemplary operation of a health controller in performing various aspects of the head health determination techniques described in this disclosure.

FIG. 4 is a flow diagram illustrating exemplary operation of a health controller in performing various aspects of the head health determination techniques described in this disclosure. Various modules (e.g., reference value module 18, current value module 20, and health status module 22 as shown in FIG. 2) of a controller (e.g., health controller 17) for a magnetic data storage drive (e.g., magnetic data storage drive 6) may perform various techniques described in this disclosure. For example, reference value module 18 of controller 17 may receive multi-variate sensor signals indicative of a respective reference value for each parameter of at least one head parameter for a head (e.g., head 8) of magnetic data storage drive 6 (60). The respective reference values may be based at least in part on at least one initial measurement of parameters of head 8 obtained at a first time.

In some examples, the at least one initial measurement may include at least one measurement taken during manufacture of head 8. In other examples, the at least one initial measurement may include at least one measurement taken during installation of head 8 into magnetic data storage drive 6. In yet other examples, the at least one initial measurement may include measurements based on expected values from a general population of similar heads. In some examples, the respective reference value includes a respective reference distribution of a plurality of data points for each respective head parameter.

Current value module 20 of health controller 17 may determine a respective predicted current value for each head parameter (62). The respective predicted current value may be based at least in part on a respective linear trend, fixed-drift model for each head parameter and the signals indicative of a respective reference value for each head parameter. In some examples, the predicted current value for the head parameters may be determined after a predetermined period of time has passed. In other examples, the predicted current value for the head parameters may be determined after an unusual, traumatic event has occurred, such as after a strong force strikes magnetic data storage drive 6, after a strong shock or vibration occurs, or after any other event that presents a significant chance that magnetic read/write head 8 may have been damaged. Checking the predicted current value of each head parameter after such an event allows controller 17 to determine a health status for magnetic read/write head 8 after likely times that magnetic read/write head 8 may be damaged without constantly monitoring the health of magnetic read/write head 8, which may reduce power usage and processing time.

Current value module 20 of health controller 17 may also determine a respective actual current value for each head parameter (64). The respective actual current value may be based at least in part on at least one current measurement of head 8 obtained at a second time later than the first time.

Health status module 22 of health controller 17 may determine a health status for head 8 (66). Health status module 22 may determine the health status based at least in part on a comparison between the respective predicted value and the respective actual current value for each head parameter of the at least one head parameter. In some such examples, health status module 22 may determine a confidence interval indicative of the health status of head 8 based at least in part on the respective reference value and the respective predicted current value for each head parameter. The health status is then stored to memory (68). Health controller 17 may then cause the determined health status to be reported to a user such as by displaying the health status on a display or on a printed report or by communicating the health status to the user via electronic means such as by electronic mail (70).

In other examples, in determining the health status, health status module 22 may calculate a multivariate log-likelihood value indicating a joint statistical deviation for each head parameter based at least in part on the respective reference value and the respective actual current value for each head parameter. In such examples, to calculate the multivariate log-likelihood value, reference value module 18 may calculate a reference distribution of the at least one head parameter from log data during a first time window.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
   measuring, at a first time with a sensor, at least one initial measurement of a plurality of multi-variate sensor signals indicative of respective reference values for each head parameter of at least one head parameter for a head of a magnetic data storage drive;
   storing the respective reference values in a memory;
   receiving, by a health controller for the magnetic data storage drive, the respective reference values;
   determining, by the health controller, a respective predicted current value for each head parameter based at least in part on a respective fixed-drift prediction model for each head parameter and the respective reference values for each head parameter;
   measuring, with the sensor, a respective actual current value for each head parameter of the at least one head parameter at a second time later than the first time;
   acquiring, by the health controller, the respective actual current value for each head parameter of the at least one head parameter;
   determining, by the health controller, a health status for the head based at least in part on a comparison between the respective predicted current value and the respective actual current value for each head parameter of the at least one head parameter; and
   storing the health status in the memory.

2. The method of claim 1, wherein the at least one initial measurement of the parameters of the head comprises at least one measurement taken in response to manufacturing of the head or at least one measurement taken in response to installation of the head into the magnetic data storage drive.

3. The method of claim 1, wherein the respective reference values comprise a respective reference distribution of a plurality of data points for each head parameter.

4. The method of claim 1, wherein acquiring the respective predicted current value comprises acquiring the respective predicted current value in response to a traumatic event or a passing of a predetermined period of time.

5. The method of claim 1, wherein determining the health status comprises:
   calculating, by the health controller, a log-likelihood value indicating a joint statistical deviation for each head parameter based at least in part on the respective predicted current value and the respective actual current value for each head parameter.

6. The method of claim 1, further comprising:
   calculating a cumulated sum of respective predicted log-likelihood values;
   calculating a drift in the cumulated sum of respective predicted log-likelihood values;
   calculating a variable-drift state adaptation of the respective fixed-drift prediction model based on the calculated drift; and
   modifying the respective fixed-drift prediction model based on the variable-drift state adaptation.

7. The method of claim 1, wherein determining the health status comprises:
   determining, by the health controller, a threshold value based on a log-likelihood confidence level;
   comparing, by the health controller, a respective mean square prediction error value to the threshold value; and
   responsive to the respective mean square prediction error value exceeding the threshold value, determining, by the health controller, that the health status is not healthy.

8. The method of claim 1, wherein:
   the head is a read head; and
   the at least one head parameter comprises a magnetoresistive read head resistance (MRR), a difference between a sensor amplitude measurement for a low frequency sine pattern and a sensor amplitude measurement for a high frequency sine pattern in common mode (ETA), a soft error rate for read-only heads (SER_RDO), a delta flying height (dFH), or a servo variable gain amplifier (SVGA).

9. The method of claim 1, wherein:
   the head is a write head; and the at least one head parameter comprises a delta flying height (dFH), a servo variable gain amplifier (SVGA), or a soft error rate for read-and-write heads (SER_RDW).

10. The method of claim 1, wherein the respective fixed-drift prediction model comprises a respective linear trend, fixed-drift prediction model.

11. An apparatus comprising:
at least one sensor configured to measure multi-variate sensor signals indicative of respective reference values for each head parameter of at least one head parameter of a head of a magnetic data storage drive; and
a health controller configured to:
measure, using the at least one sensor, a plurality of initial multi-variate sensor signals at a first time;
store the respective reference values of the plurality of initial multi-variate sensor signals in a memory;
receive the respective reference values of the plurality of initial multi-variate sensor signals from the memory;
determine a respective predicted current value for each head parameter of the at least one head parameter based at least in part on a respective fixed-drift prediction model for each head parameter and the respective reference values;
receive a plurality of current multi-variate sensor signals based at least in part on a plurality of the measured multi-variate sensor signals obtained at a second time later than the first time;
determine a respective actual current value for each head parameter of the at least one head parameter;
determine a health status for the head based at least in part on a comparison between the respective predicted current value and the respective actual current value for each head parameter of the at least one head parameter; and
store the health status in the memory.

12. The apparatus of claim 11, wherein the plurality of the measured multi-variate sensor signals obtained at the first time comprise multi-variate sensor signals obtained in response to manufacturing of the head or in response to installation of the head into the magnetic data storage drive.

13. The apparatus of claim 11, wherein the respective reference values comprise a respective reference distribution of a plurality of data points for each head parameter.

14. The apparatus of claim 11, wherein the health controller is further configured to:
calculate a cumulated sum of respective predicted log-likelihood values;
calculate a drift in the cumulated sum of respective predicted log-likelihood values;
calculate a variable-drift state adaptation of the respective fixed-drift prediction model based on the calculated drift; and
modify the respective fixed-drift prediction model based on the variable-drift state adaptation.

15. The apparatus of claim 11, wherein determining the health status comprises the health controller being further configured to:
determine a threshold value based on a log-likelihood confidence level;
compare a respective mean square prediction error value to the threshold value; and
responsive to the respective mean square prediction error value exceeding the threshold value, determine that the health status is not healthy.

16. The apparatus of claim 11, wherein the respective fixed-drift prediction model comprises a respective linear trend, fixed-drift prediction model.

17. A non-transitory computer-readable storage medium not embodied in a carrier wave or a propagated signal, the non-transitory computer-readable storage medium containing instructions that, when executed, cause a programmable processor to:
measure multi-variate sensor signals using a sensor coupled to a head of a magnetic data storage drive, wherein the multi-variate sensor signals are:
indicative of respective reference values for each head parameter of at least one head parameter for the head; and
based at least in part on at least one initial measurement of parameters of the head obtained at a first time;
store the respective reference values in a memory;
receive the respective reference values from the memory;
determine a respective predicted current value for each head parameter of the at least one head parameter based at least in part on a respective fixed-drift prediction model for each head parameter and the received respective reference values for each head parameter;
measure a respective actual current value, with the sensor of the head at a second time later than the first time;
determine a health status for the head based at least in part on a comparison between the respective predicted current value and the respective actual current value for each head parameter of the at least one head parameter; and
store the health status in the memory.

18. The non-transitory computer-readable storage medium of claim 17, wherein the instructions further cause the programmable processor to:
calculate a cumulated sum of respective predicted log-likelihood values;
calculate a drift in the cumulated sum of respective predicted log-likelihood values;
calculate a variable-drift state adaptation of the respective fixed-drift prediction model based on the calculated drift; and
modify the respective fixed-drift prediction model based on the variable-drift state adaptation.

19. The non-transitory computer-readable storage medium of claim 17, wherein the instructions that cause the programmable processor to determine the health status comprise instructions that, when executed, cause the programmable processor to:
determine a threshold value based on a log-likelihood confidence level;
compare a respective mean square prediction error value to the threshold value; and
responsive to the respective mean square prediction error value exceeding the threshold value, determine that the health status is not healthy.

20. The non-transitory computer-readable storage medium of claim 17, wherein the measured multi-variate sensor signals obtained at the first time comprise multi-variate sensor signals obtained in response to manufacturing of the head or in response to installation of the head into the magnetic data storage drive.

* * * * *